Patented Oct. 12, 1943

2,331,327

UNITED STATES PATENT OFFICE 2,331,327

MAKING CHLORINATED RUBBER HYDROCHLORIDE

Walter M. Kutz, Pittsburgh, Pa., assignor to The Raolin Corporation, New York, N. Y., a corporation of West Virginia No Drawing. Application April 27, 1940, Serial No. 332,115

4 Claims. (Cl. 204—160)

This invention or discovery relates to making chlorinated rubber hydrochloride; and it comprises an improved method of making homogeneously chlorinated rubber hydrochloride of high chlorine content and other desirable characteristics, wherein rubber is dispersed in a volatile organic solvent, the dispersion is advantageously thoroughly dried, as by boiling under a reflux with stirring to disaggregate the rubber micelles, the dispersion or "cement" is treated with dry hydrogen chloride gas to form rubber hydrochloride, and the hydrochloride is then treated with dry chlorine gas under the influence of ultra violet light to produce chlorinated rubber hydrochloride, advantageously with a chlorine content of about 42 per cent to 52 per cent; the residual unreacted gases being removed, and solid chlorinated rubber hydrochloride being recovered from the solvent; all as more fully hereinafter set forth and as claimed.

Rubber hydrochloride is an addition product of rubber and hydrogen chloride, usually made by treating rubber in solution with gaseous HCl, and is supposed, as an ideal composition, to have a formula corresponding to $C_{10}H_{18}Cl_2$. This should contain 34.8 per cent chlorine, by weight. In commercial practice, however, it is seldom possible to obtain a product containing more than 31 per cent chlorine.

Rubber hydrochloride, $C_{10}H_{18}Cl_2$, made as described, is known as symmetrical rubber hydrochloride. It is soluble in benzol to the extent of about 3 per cent by weight. Attempts to increase the concentration above this point generally lead to setting and the formation of a gel. A somewhat different type of rubber hydrochloride, made in another way, is known as asymmetrical rubber hydrochloride, and is soluble in benzol up to about 7 per cent by weight.

Both types of rubber hydrochloride can be chlorinated by treatment with chlorine under suitable conditions, thus obtaining products containing more than 34.8 per cent total chlorine. Such products are known as chlorinated rubber hydrochlorides, and have commercially desirable properties. In a general way, the greater the total amount of chlorine, the better is the material.

It is an object achieved in the present invention to provide an improved process of producing chlorinated symmetrical rubber hydrochloride. My invention is also applicable, however, to the production of chlorinated asymmetrical rubber hydrochloride. In both cases, the chlorinated final products are more uniform in character, and have more desirable characteristics than the chlorinated rubber hydrochlorides commercially available. In adition, in my invention there is a more efficient utilization of the reacting materials with a consequent economy in costs.

One of the features of my improved process involves conducting the chlorination of a suitably prepared rubber hydrochloride solution or dispersion under the influence of ultra-violet light, which advantageously has a wave length from 2800 A. to 3600 A. Radiations outside this range are less useful. Mercury vapor lamps can be used. Ultra-violet irradiation during the chlorination of rubber hydrochloride solutions gives a better absorption of chlorine, a more thorough and uniform chlorination, and products of higher chlorine content.

For my purposes, it is also advantageous, as stated, to have the initial rubber solution ("rubber cement") as dry as possible, and thoroughly dispersed; with as thorough a disaggregation of the rubber micelles as possible. The rubber cement then takes up HCl better and more uniformly; there is a regularity in result not found possible without these treatments. The rubber hydrochloride solution formed from such cement is more or less transparent, and it takes up chlorine readily; especially under ultra-violet radiation.

A copending application of Raynolds & Kutz, Serial No. 326,803, discloses that chlorinated rubber hydrochloride having a chlorine content between 42 per cent and 52 per cent is highly advantageous for use in the preparation of linings for container closures. Chlorinated rubber hydrochlorides of this chlorine content also have very desirable characteristics for use in sheet form; as wrapping films, for example. A purpose achieved in the present invention is the production of a chlorinated rubber hydrochloride having a total chlorine content above 42 per cent, and useful for the stated purposes.

Rubber can be combined with hydrogen chloride to form the symmetrical type of rubber hydrochloride in any of several organic solvents in which dry hydrogen chloride gas is soluble to some extent. Chloroform, benzene and monochlor benzene are some of the useful solvents for this purpose. Carbon tetrachloride is not a desirable solvent.

The reaction of HCl with rubber proceeds best at temperatures below 15° C. A temperature between 5° to 10° C. is satisfactory, and is conveniently maintained during the reaction. Even lower temperatures are often desirable. The addition of HCl is a slow reaction and a batch ordinarily requires 12 to 24 hours' treatment for complete reaction. Superatmospheric pressures may be applied to accelerate the reaction. Certain catalysts, such as aluminum chloride and stannic chloride, are also known to accelerate the reaction. In the present invention, these are not necessary, and it is preferred to avoid additions which would give a less pure final product.

Rubber can be chlorinated in solution at various temperatures, from about −15° C. to +50° C., without noticeable effect on the efficiency of the reaction, especially in the production of chlorinated rubber with chlorine contents from 50 to 60 per cent. The reaction of rubber with hydrogen chloride proceeds best at temperatures below 15° C., as noted. On the other hand, rubber hydrochloride cannot be readily chlorinated in the cold. At 25° C., little or no reaction takes place, and the lowest temperature at which the reaction can be readily effected is believed to be in the range from 50° to 60° C. When benzene is used as the solvent, the reaction proceeds best at temperatures near the boiling point; that is, at about 80° C.

Even under the most favorable temperature conditions, however, the efficiency of the reaction involved in chlorinating rubber hydrochloride has been extremely poor in processes previously employed. Large excesses of chlorine were used, and most of the excess chlorine escaped as non-reacted gas difficult to recover. It has been quite unusual to obtain products containing more than about 40 per cent of fixed chlorine; and this has been true even when chlorinating under favorable conditions, with the rubber hydrochloride dissolved in monochlor benzene and maintained at a temperature of 80° C. during the chlorination. Poor utilization of chlorine and the production of final products containing not substantially above 40 per cent chlorine have been characteristic results of prior ways of making chlorinated rubber hydrochloride.

The reactions involved in chlorinating rubber hydrochloride may be represented as follows:

(A)  $C_{10}H_{18}Cl_2 + Cl_2 = C_{10}H_{17}Cl_3 + HCl$
(B)  $C_{10}H_{18}Cl_2 + 2Cl_2 = C_{10}H_{16}Cl_4 + 2HCl$

The product of reaction "A" is a chlorinated rubber hydrochloride containing 43.7 per cent chlorine, while the product of reaction "B" contains 51.4 per cent of fixed chlorine. The efficiency of these reactions has been determined in a series of experiments in which a known weight of rubber hydrochloride in solution was treated with a known weight of chlorine gas. The rubber hydrochloride in all cases had a fixed chlorine content between 31 per cent and 32 per cent, and the efficiency calculations are based upon the amount of chlorine substituted in a rubber hydrochloride containing 31 per cent chlorine. The results of one series of these tests are set forth hereinbelow in Table I.

*Table I*

| Solvent | Reaction temperature | Weight rubber hydrochloride | Weight chlorine used | Cl₂ final product | Efficiency of reaction |
|---|---|---|---|---|---|
| | °C. | | | Per cent | Per cent |
| Benzene | 80 | 60 | 50 | 37.8 | 26 |
| Monochlor benzene | 80 | 15 | 10 | 34.5 | 16 |
| | | 15 | 20 | 39.0 | 20 |
| | | 15 | 30 | 40.9 | 17 |

This table shows that the efficiency of the utilization of the chlorine is not high enough to make the processes tested economical. Furthermore, the chlorine contents of the products are not in the desirable range, 42 per cent to 52 per cent.

I have found that the difficulties encountered in attempting to prepare chlorinated rubber hydrochloride by previously known methods are largely eliminated by using a rubber hydrochloride solution made as described, and carrying out the chlorinating reaction under the influence of ultra-violet light. This makes possible chlorinated rubber hydrochloride having the desired fixed chlorine content, 42 per cent to 52 per cent, or more. It also materially increases the efficiency of the utilization of chlorine. Less goes by unused. This is illustrated in Table II, which shows the results of a series of tests under conditions similar to those in Table I, except that the chlorination was effected under the influence of ultra-violet light having a wave length from 2800 A. to 3600 A. Tests have demonstrated that this is the most effective range of wave lengths. In both series of tests, the reaction time was the same; two hours.

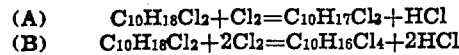
*Table II*

| Solvent | Reaction temperature | Weight rubber hydrochloride | Weight chlorine used | Cl₂ final product | Efficiency of reaction |
|---|---|---|---|---|---|
| | °C. | | | Per cent | Per cent |
| Benzene | 80 | 60 | 30 | 42.6 | 81 |
| | | 60 | 40 | 46.2 | 85 |
| | | 60 | 50 | 47.7 | 76 |
| Monochlor benzene | 80 | 15 | 10 | 44.5 | 72 |
| | | 15 | 20 | 52.0 | 66 |

As shown in Table II, by conducting the chlorinating reaction under the influence of ultra-violet radiation, it is possible to obtain final products having the desired chlorine content. This also increases the efficiency of the reaction sufficiently to make it commercially useful.

The results are, as stated, further improved if the rubber cement or dispersion initially prepared is treated to eliminate water present, and to disaggregate the rubber micelles to form a cement of minimum viscosity. This is conveniently effected by boiling the cement under reflux for a few hours, after which it is advantageous to raise the temperature for a few minutes to distil over a little of the solvent, carrying away any water trapped in the system. Any water present in the system tends to collect in the condenser, or to pass through the condenser and escape from the system, due to the azeotropic distillation. When this preliminary treatment is employed, it is found that the subsequent reactions involved in the addition of HCl, followed by substitution of chlorine, are greatly facilitated; and that the stability and other characteristics of the final product are improved.

It should be understood that chlorinating under the influence of ultra-violet radiation produces desirable results, regardless of whether the system is anhydrous; but that the best results are obtained when the system is initially dehydrated and maintained substantially free from water throughout the subsequent treatments.

In one embodiment of the present invention, 100 parts by weight of rubber were dissolved in 3000 parts by weight of substantially iron-free benzene. The rubber employed in this particular embodiment was deproteinized rubber, but pale crepe and other suitable commercial grades of rubber have been similarly treated. In general, the higher the purity of the rubber employed as a starting material, the better the characteristics of the final product.

The dispersion of the rubber in benzene was effected out of contact with iron, in a glass enameled vessel. This is advantageous. The vessel was fitted with a reflux condenser which was open to the atmosphere and arranged for connection with an acid absorbing system by means of a control valve. The vessel was jacketed, and provided with means for heating or cooling the contents. It was also provided with an agitator, which improves heat distribution during the reaction, and with means for withdrawing the contents of the vessel and circulating it past a quartz window and back to the vessel. Near the quartz window, a mercury vapor lamp was set up to provide ultra-violet irradiation of the circulated solution.

The mixture of rubber and benzene was heated to reflux temperature (about 80° C.) and agitated until the cement was homogeneous and of low viscosity. This usually requires four or five hours, but it is sometimes desirable to continue the heating under reflux for eight hours or more. During this period, the cement is dried by azeotropic distillation of contained water.

The substantially anhydrous cement of low viscosity is then cooled by circulating brine (or other cooling medium) through the jacket of the vessel. The temperature of the cement was reduced in this manner to between 5° and 10° C. Dry hydrogen chloride gas was then admitted to the vessel during a three-hour period, the total admitted being slightly above the amount theoretically required to convert the rubber in the cement to the dihydrochloride, $C_{10}H_{18}Cl_2$. The temperature was then allowed to rise slowly over a 24-hour period, until a temperature of about 25° C. was reached. Rubber hydrochloride containing from 31 per cent to 32 per cent of fixed chlorine was thus formed in solution.

The temperature of the batch was then raised to about 80° C., with thorough agitation. Dry chlorine gas was introduced into the vessel, and the solution was circulated past the quartz window and thus exposed to ultra-violet light. The reaction proceeded rapidly, with liberation of HCl. The HCl was recovered in an acid absorber connected with the reflux condenser.

Chlorination was continued until the desired final chlorine content (above 42 per cent) was obtained. This did not require more than two hours under the stated conditions. The flow of chlorine was then stopped, and dry air at about 2-pounds gage pressure was blown through the solution to remove residual HCl and any unreacted chlorine.

This resulted in the production of a substantially neutral solution of chlorinated rubber hydrochloride containing more than 45 per cent of fixed chlorine. As noted, the most desirable products contain from 42 per cent to 52 per cent of fixed chlorine.

Solid chlorinated rubber hydrochloride may be recovered from its solutions in any desired manner, as by precipitation with water or anhydrous alcohol. If it is desired to use the rubber hydrochloride in the form of a film or sheet, it may be recovered directly in this form from the neutral pot liquor, as by evaporation of the solvent from films of the solution, produced in known manner.

In the embodiment described, dehydration, hydrochlorination and chlorination were all effected in the same vessel. It is to be understood, however, that it is often desirable to treat different quantities of solution or dispersion during the different stages of the process; and that, if desired, the different stages may be performed in different vessels. Various other modifications of the process as described hereinabove are within the scope of this invention.

Regardless of the details of operation involved, my process makes it readily possible to produce a stable chlorinated rubber hydrochloride containing more than 42 per cent of fixed chlorine, and makes it possible to obtain such products in an economical manner. With the rubber hydrochloride finely divided and dispersed, as in solution, during the chlorinating stage, each particle or micelle is in motion, and each is individually subjected to the action of chlorine and ultra-violet radiation. This promotes rapid and uniform reaction. When the system is dry, uniformity and rapidity of reaction are even more easily achieved.

What I claim is:

1. In the production of chlorinated rubber hydrochloride of high total combined chlorine content, with high reaction efficiency, the step which comprises treating a dilute dispersion of rubber hydrochloride in an organic solvent capable of forming a thorough disaggregation of the micelles of the rubber hydrochloride, with chlorine at a temperature above 25° C. while subjecting the dispersion to ultraviolet radiation, continuing the reaction and adding sufficient chlorine so that chlorinated rubber hydrochloride of total combined chlorine content above 42 per cent is formed, and recovering said chlorinated rubber hydrochloride.

2. The method of claim 1 wherein the treatment is effected under substantially anhydrous conditions.

3. The method of claim 1 wherein said ultraviolet radiation has a wave length within the range of from 2800 A. to 3600 A.

4. The method of claim 1 wherein the reaction is continued and sufficient chlorine added so that a chlorinated rubber hydrochloride is formed having a total combined chlorine content of from 42 per cent to 52 per cent fixed chlorine.

WALTER M. KUTZ.